US006433672B1

(12) United States Patent
Shirmard

(10) Patent No.: US 6,433,672 B1
(45) Date of Patent: Aug. 13, 2002

(54) COMBINED POWER AND COMMUNICATION DELIVERY SYSTEM AND KIT FOR INSTALLATION AT OR BEYOND THE DEMARCATION POINT

(76) Inventor: Shirin Khademi Shirmard, 218 Southcrest Drive, London, Ontario (CA), N6J 1N1

( * ) Notice: Subject to any disclaimer, the term of this patent is extended or adjusted under 35 U.S.C. 154(b) by 0 days.

(21) Appl. No.: 09/243,425

(22) Filed: Feb. 3, 1999

(51) Int. Cl.[7] .............................................. H04M 11/04
(52) U.S. Cl. .................. 340/310.01; 379/412; 379/441; 439/502; 439/507; 439/578; 361/119; 375/257
(58) Field of Search ..................... 340/310.01; 379/412, 379/413, 441, 443, 437; 439/502, 504, 505, 507, 578, 579, 580, 581; 375/257; 361/119

(56) References Cited

U.S. PATENT DOCUMENTS

| 4,438,477 | A | * | 3/1984 | Cawley ....................... 361/111 |
| 4,598,173 | A |   | 7/1986 | Chea, Jr. et al. |
| 4,613,732 | A |   | 9/1986 | Cwirzen et al. |
| 4,847,898 | A |   | 7/1989 | Doll et al. |
| 4,847,899 | A |   | 7/1989 | Hikida |
| 5,144,544 | A |   | 9/1992 | Jenneve et al. |
| 5,268,666 | A | * | 12/1993 | Michel et al. ......... 340/310.01 |
| 5,396,555 | A |   | 3/1995 | Shibata et al. |
| 5,544,243 | A |   | 8/1996 | Papadopoulos |
| 5,687,228 | A |   | 11/1997 | Ellington, Jr. et al. |
| 5,822,692 | A | * | 10/1998 | Krishan et al. .............. 455/419 |
| 5,850,436 | A | * | 12/1998 | Rosen et al. ................. 379/377 |
| 6,007,372 | A | * | 12/1999 | Wood .......................... 439/502 |
| 6,098,127 | A | * | 8/2000 | Kwang .......................... 710/62 |
| 6,126,463 | A | * | 10/2000 | Okazaki et al. .............. 439/188 |
| 6,152,778 | A | * | 11/2000 | Dalton ......................... 439/638 |
| 6,207,895 | B1 | * | 3/2001 | Engel ........................... 174/53 |

FOREIGN PATENT DOCUMENTS

| CA | 1058297 | 7/1979 |
| CA | 2199886 | 3/1997 |

* cited by examiner

*Primary Examiner*—Nina Tong
(74) *Attorney, Agent, or Firm*—R. Craig Armstrong

(57) ABSTRACT

A combined power and communication delivery system for installation at or beyond the demarcation point in a residential or business building is described. The system has a power input module and a plurality of traditional voice and data communication wires, one pair of the wires being an unused voice or data communication line and being connected to the power input module thereby making the one pair a current-carrying line, and the plurality of wires terminating at at least one female multi-wire telephone jack. The system further having at least one power-communication cable, having a first end being a male multi-wire plug to releasably engage the female multi-wire telephone jack, a second end partially depending from the first end carrying one or more voice and data communication transmission lines, and a third end partially depending from the first end to transmit current from the current-carrying line.

9 Claims, 6 Drawing Sheets

COMBINED POWER AND COMMUNICATION DELIVERY SYSTEM AND KIT FOR INSTALLATION AT OR BEYOND THE DEMARCATION POINT

BACKGROUND OF THE INVENTION

1. Field of the Invention

This invention relates to power and voice/data communication transmission systems for use at or beyond the demarcation point in a residential or business building.

2. Description of the Prior Art

In some conventional telecommunication devices, such as with answering machines, cordless and cord telephones, there are instances where an undesirable plurality of cables connect each of said telecommunication devices for voice/data transmission and electrical power transmission. As an example, elective telephone service features such as Caller ID™ or Call Display™ offered by telephone companies require two cables to be run to certain telephones using this service. The first of said cables carries the voice/data communication transmission, whereas the second of said cables carries power to operate the elective service in the telephone. One such telephone is the Nortel™ made Maestro™ model telephone. Such telephones feature-capable telephones now conventionally require a power supply cable to connect the telephone to a nearby electrical wall outlet via a DC adaptor. In addition to the power supply cable, there is also the traditional voice/data cable that connects the telephone to the telephone jack. Accordingly, there are two cables and one DC power adapter in the set up for each such feature-capable telephone. A similar conventional cabling layout is required for a stand-alone answering machine or a cordless telephone whether or not any elective feature services are available. There are a number of disadvantages that flow from the current conventional setup.

First, having two cables and a DC power adapter results in an undesirably messy, and cumbersome setup at each such conventionally laid telecommunication device location. Second, children have been found to play and tangle themselves in the array of cables that loosely dangle behind each such telecommunication device. The problem escalates when the notion that many homes or businesses have three or more such devices at different locations in their premises—all requiring the same setup. It is desirable to have a system in which there is a reduction of the number of cables required at each telecommunication device installation.

SUMMARY OF THE INVENTION

It is an object of the invention to provide a system in which the layout of the cables required for a telecommunication device such as a feature rich telephone, a cordless telephone (either feature-rich or not) or an answering machine is simple and the limited to one cable per installation that is easily managed.

It is another object of the invention to reduce the number of cables required at a telecommunication device installation.

The invention effectively utilizes the spare unused line that is found in the telephone wiring in a house to distribute power through it. In a first embodiment, the invention comprises an interface (hereinafter referred to as a "power input module") in which a single power source feeds power into the unused line at the demarcation point. As a result, the internal telephone wiring running throughout the house is now powered from a single source and the power may be accessed via regular telephone jacks. All that a user needs to do to get power and voice from a telephone jack is to connect a telecommunication device, such as a telephone, to a new combined power-communication cable. The new combined power-communication line makes use of the dual transmissions, namely voice/data communication and power, accessible from the telephone jack. Advantageously, there is only one cable (separated only at a point near the telephone) necessary at each telephone. Moreover, there is no need to have a power transformer at each telephone connected to a power supply outlet. When all devices require the same voltage, only one central power transformer is required (at the demarcation point interface).

In the invention, there is provided a combined power and communication delivery system for installation at or beyond the demarcation point in a residential or business building, said system comprising: a power input module; a plurality of traditional voice/data communication lines, one of said lines being an unused voice or data communication line and being connected to said power input module thereby making said first of said lines a current-carrying line, said plurality of lines terminating at least one female multi-wire telephone jack; and, at least one power-communication cable, said cable characterized by a first end being a male multi-wire plug to releasably engage said female multi-wire telephone jack, a second end partially depending from said first end carrying one or more voice and data communication transmission lines, and a third end partially depending from said first end to transmit current from said current-carrying line.

In another embodiment of the invention, namely in situations where there are different telephones sharing the same voice/data communication line, but requiring different DC voltages, the present invention may be adapted to include a multi-interface power input module to accommodate power for each DC voltage level. In this case, there would be more than one current-carrying line.

In another embodiment of the invention, the combined power-communication cable may include a fourth end also depending from said first end carrying current from said current-carrying line, or a second current-carrying line.

Further features of the invention will be described or will become apparent in the course of the following detailed description.

BRIEF DESCRIPTION OF THE DRAWINGS

In order that the invention may be more clearly understood, a preferred embodiment as well as alternative embodiments thereof will now be described in detail by way of example, with reference to the accompanying drawings, in which.

DETAILED DESCRIPTION OF THE PREFERRED EMBODIMENT

Figure 1:
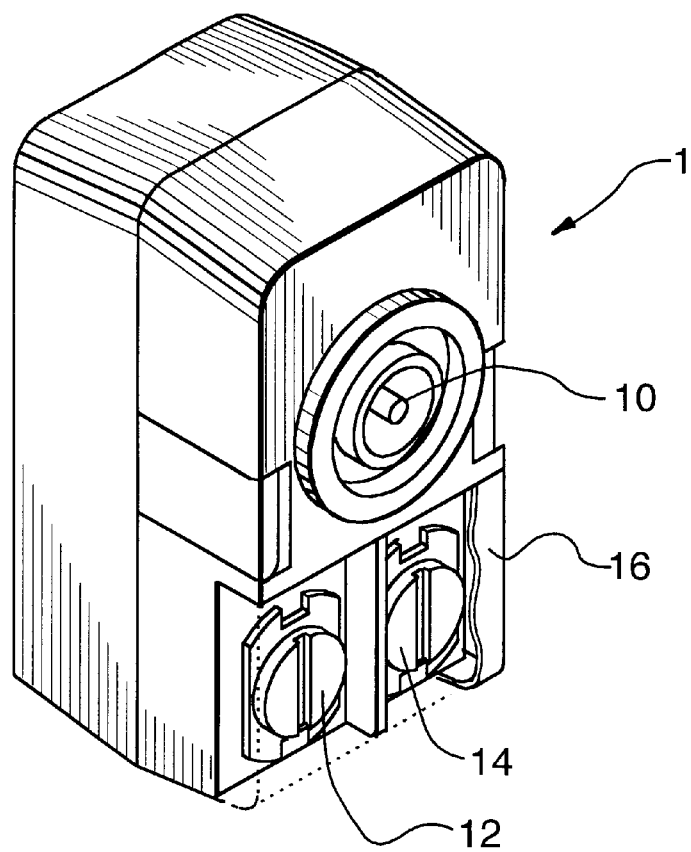
FIG. 1 is a front perspective view of a preferred embodiment of the power input module.

For the purposes of this description, the "demarcation point" is the location where the wires that are inside a residential or business building are connected to the telephone company's network. Usually, this connection occurs at a "network interface device". The network interface device is usually the small black box where the telephone wires inside a dwelling are connected to the telephone company's network. Typically in older dwellings there may not be a network interface device, but instead a network interface jack or also referred to as a demarcation jack. The demarcation jack is located inside the dwelling to accommodate the connection of the inside wires to the telephone company's network. In a multi-unit or multi-storey building, the demarcation point exists at the location that the telephone company wires connect to the main jack in the apartment unit. In a retail or business unit, the demarcation point is the location that the telephone company's wires enter the unit and are connected to the inside wiring. Any telephone wiring beyond this demarcation point is usually the customer's property and not the telephone company's. The present invention utilizes the unused/dormant telephone wiring at or beyond the demarcation point in the customer's premises as part of a system to deliver both voice/data communication and power to telecommunication device.

It is to be understood that in a typical residential dwelling there is sufficient telephone wiring pre-installed for service of at least two telephone lines therein. In most cases, however, the customer has elected to activate only one line. The second line remains dormant and unused. The idea behind leaving wiring for a dormant line in a building is to limit the costs to the end user should the user choose to have a second line activated by having the second line wiring pre-installed throughout the dwelling. This practice is similarly executed in business buildings as well. In some instances, buildings may have telephone wiring set up for service for four lines or more. In all those instances, there is usually an "extra" line left dormant or unused ready for activation at a later date. The invention described herein utilizes the dormant or unused line to provide a combined power-communication delivery system for communication devices, such as telephones, answering machines, caller identification devices, etc. The invention may also be used when there is no pre-installed dormant line wiring. In that case, the customer must install additional wiring to act as a power transmitting line to make use of the invention.

The invention will be now described in connection with preferred and alternative embodiments, but for the sake of brevity the following description describes the situation where there is one active line and one dormant line; however, it will be understood that the description is not intended to limit the invention to this situation only. As such the description is intended to cover all alternatives, modifications, and equivalents as may be included within the spirit and scope of the invention as defined by the appended claims.

With reference to FIGS. 1–3, 7, the invention comprises at least one power input module, generally designated with reference numeral 1, and at least one combined power-communication cable 2. The power input module effectively retransmits power from an external power supply 4, usually user supplied, and into current-carrying wires 41, 44 or also known as the dormant or unused line. The module comprises, preferably, a two-piece detachable body. In the module there is included a power input connection 10, preferably a female coaxial connector, for receiving power from the external power supply 4 via preferably a coaxial male plug 6 from a DC transformer. Depending on the power requirement of the telephone, the voltage of the transformer may be different, but a typical voltage may be 12 V DC. In this embodiment, the wire terminals 12, 14 are externally mounted and readily accessible to the user, but preferably protected by a living hinged cover 16, shown in partial ghost in FIG. 1, to protect the user from accidental exposure to the same. The back of the module preferably includes means for mounting, such as a self-adhesive pad (not shown), the module to a surface such as a wall.

Figure 2:
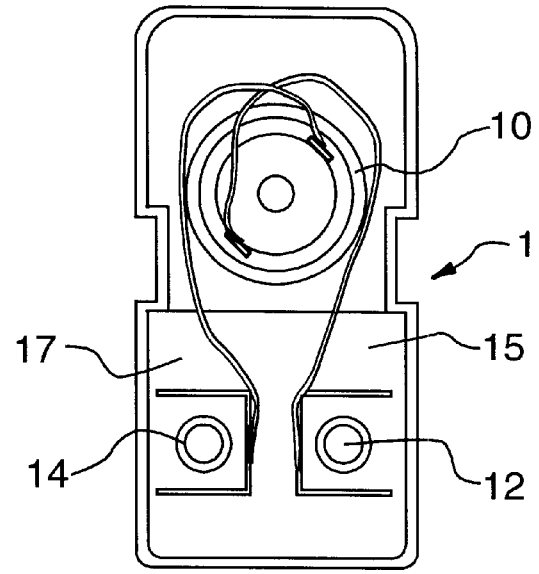
FIG. 2 is a rear interior view of the module of FIG. 1 with the rear cover removed.

Referring to FIG. 2 specifically, there is shown the interior view of the power input module as seen from the rear with the back cover removed. The female coaxial connector 10 is electrically connected to terminals 12, 14 via intermediate set of wires 15, 17.

Figure 3:
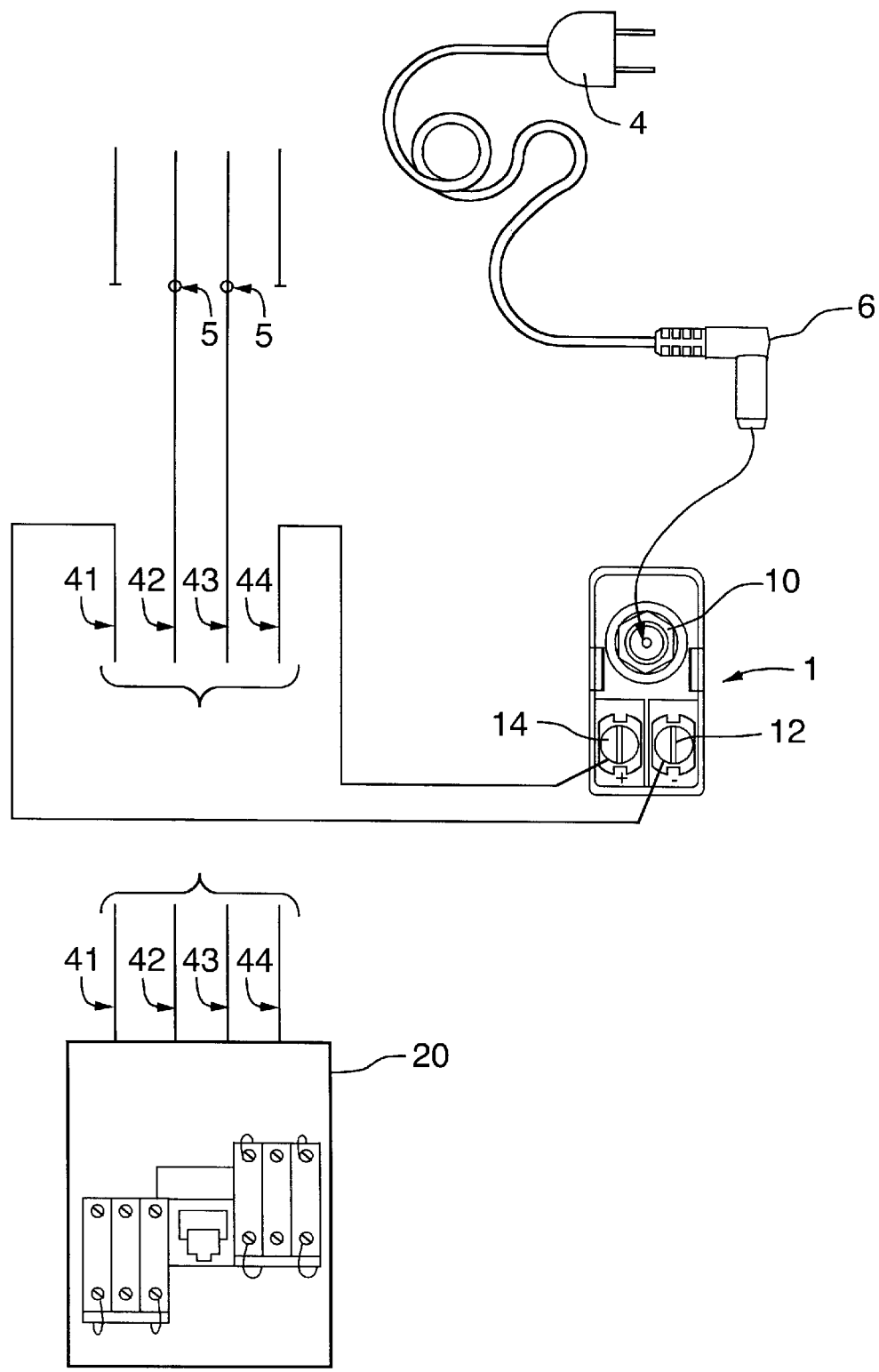
FIG. 3 is a schematic layout illustrating how an unused set of voice/data communication lines near the demarcation point is utilized with the power input module.

Turning to specifically FIG. 3, the installation of the power input module is shown relative to the demarcation point, generally designated 5. Wires 41, 42, 43, 44 are conductors of a distribution cable that has a star wiring configuration. In the invention, the end user is required to do some minor installation of the power input module with the dormant wiring of the building. As shown in FIG. 3, dormant wire 41 is terminated directly to terminal 14, while dormant wire 44 is terminated directly to terminal 12. In contrast, active voice/data communication wires 42, 43 are left undisturbed. Once the dormant wires 41, 44 are connected to the power input module, an external power supply may be connected to the module via the male connector 6, thereby making dormant wires 41, 44 live and current-carrying wires. Although not illustrated for brevity reasons, wires 41, 42, 43, 44 proceed to fan out throughout the building and terminate at various telephone jack locations. The distribution of the wires may be either in a star wiring layout or not. Wires 41, 42, 43, 44 are shown in FIG. 3 to connect and provide a continuous path for telecommunication and electrical transmission to the telephone jack 20.

Figure 4:
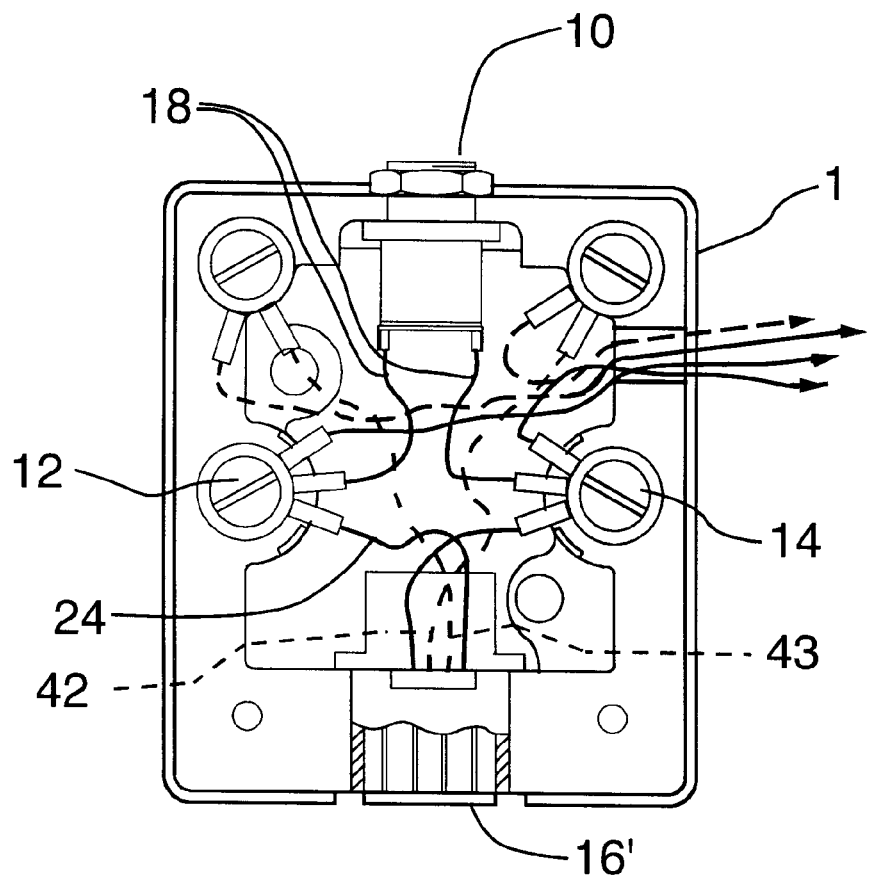
FIG. 4 is a front interior view of a first alternative embodiment of the power input module.
Figure 5:
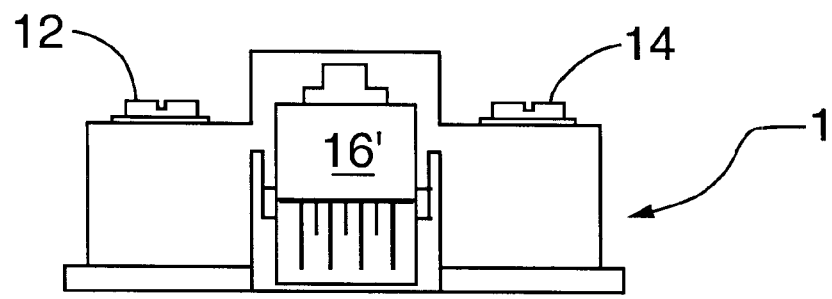
FIG. 5 is a side view of FIG. 4 rotated 90° thereto.
Figure 6:
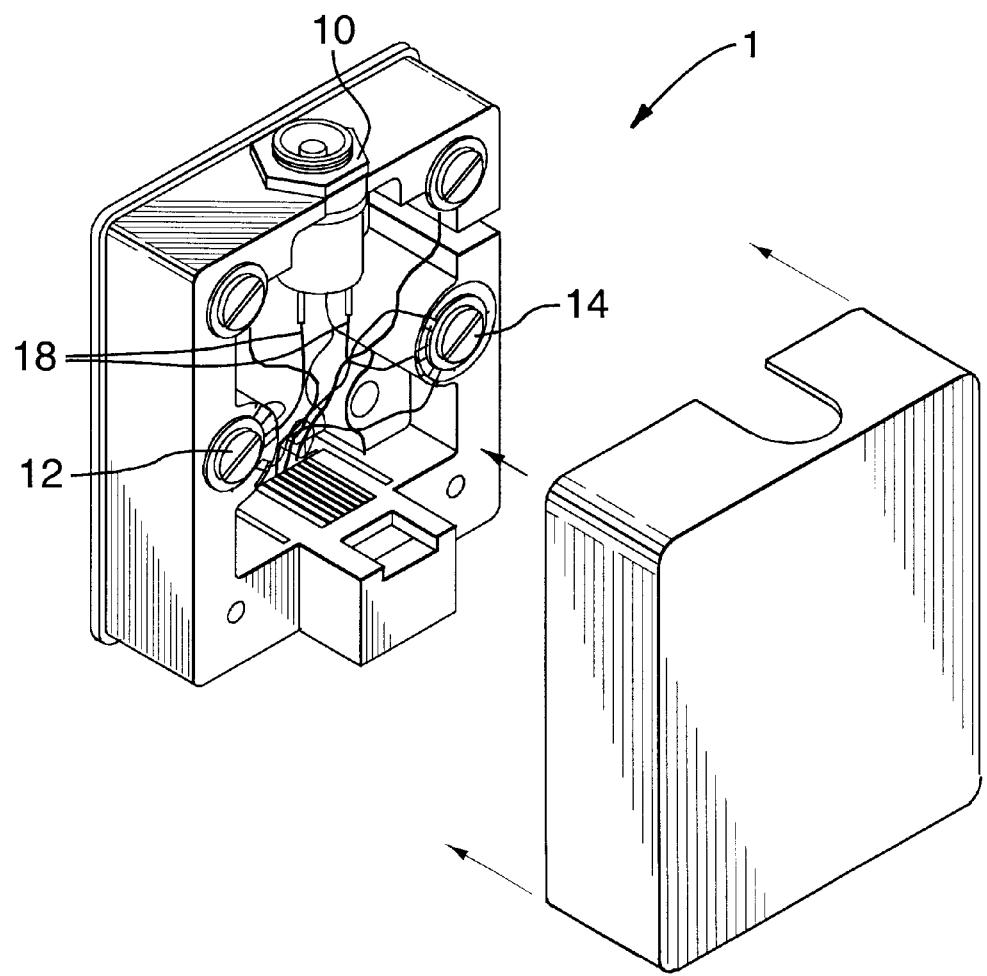
FIG. 6 is an assembly view of the cover being placed into position over the module of FIG. 4; and, FIG. 7 is a preferred embodiment of the combined power-communication cable for a single communication line environment sans any dielectric medium for illustrative purposes only.

With reference to FIGS. 4–6, an alternative embodiment of the power input module is shown. In this embodiment, to electrically connect the female connector 10 to the current-carrying wires 41, 44 a intermediate transfer elements are used, namely a first set of distribution wires 18 that terminate on wire terminals 12, 14 and at the electrical contacts of connector 10. Preferably, a second set of distribution wires 24 connect to the to a set of electrical contacts within a multi-wire female connector 16' disposed within the module so that the power input module may double as a telephone jack as well. Consequently, in the embodiment wherein the module is also functions as a telephone jack, power distribution wires 42, 43 (as shown in dotted fashion) are required. It is to be understood that a person skilled in the art may adjust the layout of the wiring scheme for adapting the embodiment described above for environments where there are a plurality of active lines.

With reference to FIG. 6, there is shown an assembly view of the power input module and the detachable cover.

Figure 7:
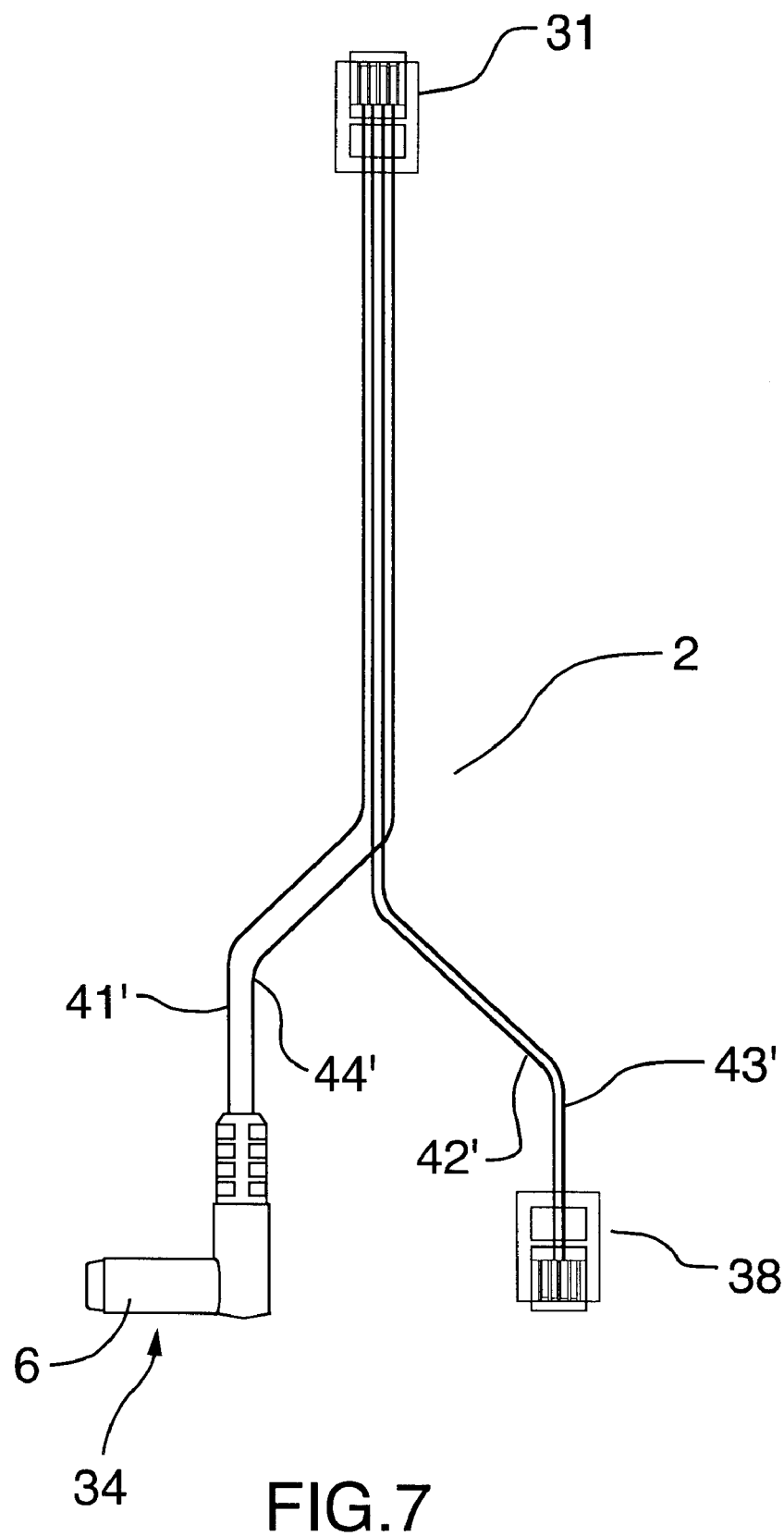

Now with reference to FIG. 7, a power-communication cable 2 is shown. This cable carries both the traditional voice/data communication signals and the power from the wiring connected to the telephone jack made possible vis a vis the power input module. This cable has a first end 31 to releasably engage a telephone jack. The first end is preferably a conventional male multi-wire connector to readily engage and communicate with conventional telephone jacks. The cable 2 proceeds from the first end to a second end 38 partially depending from the first end. The second end transmits the voice/data communication from wires 42, 43 via wires 42', 43'. A third end 34 partially depends from the first end to transmit current from the current-carrying line 41, 44 via wires 41', 44'. Naturally, the wires disposed at the interface of the connector 31 coincide with those wires in the telephone jack to properly transmit the correct signals—be it electrical or telecommunication.

In accordance with the invention,the add-on components to the traditional telephone wiring (i.e., the components of the kit), namely the power-communication cable 2 and the input power module 1 are inexpensive to manufacture, and can be quickly and easily installed. To these ends, the body and cover of the input power module may be made from any suitable dielectric hard plastic material of low cost which permits easy part fabrication and provides long service life. The input and output connectors are standard co-axial female connectors and wire terminals respectively. Likewise, the insulating material of the power-communication cable maybe made from any suitable dielectric medium that is sufficiently flexible.

Figure 8:
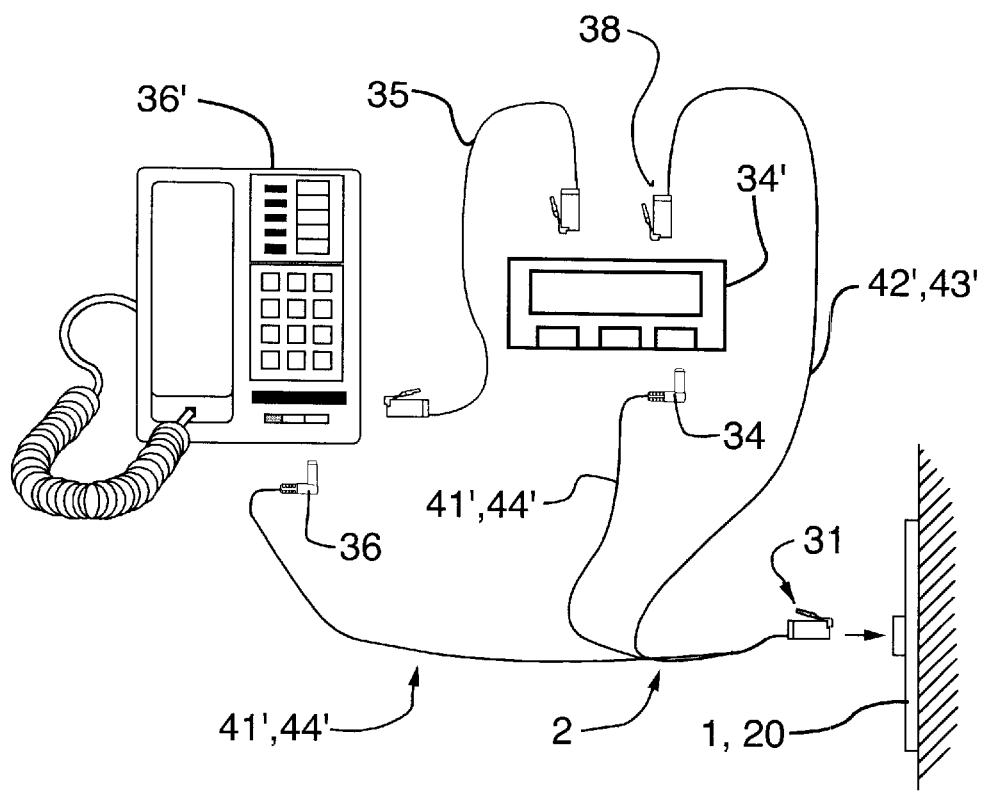
FIG. 8 is a schematic view of a telephone and an answering machine used in conjunction with a first alternative embodiment combined power-communication cable; and, FIG. 9 is a side assembly view of second alternative embodiment of the power input module.

In another embodiment of the invention, as shown in FIG. 8, the combined power-communication cable include a fourth end 36 also depending from said first end carrying current from said current-carrying line, or a second current-carrying line (not shown). The fourth end may then connect to a telephone 36', for instance, while third end 34 may be connected to an answering machine 34'. While a connector line 35 would connect the telephone to the answering machine for communication connection.

Figure 9:
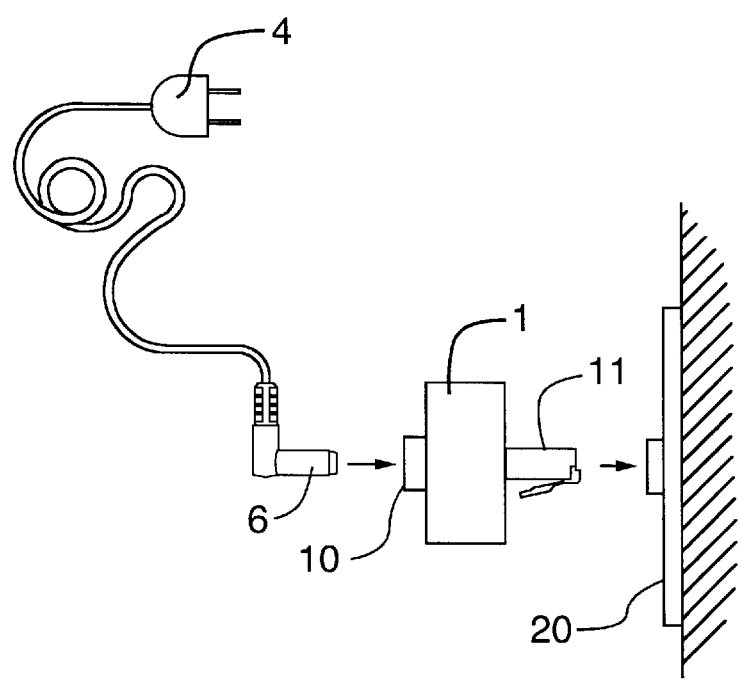

In another embodiment of the invention, as shown in FIG. 9, a male multi-wire connector 11 on the body of the module could replace the terminals 12, 14 as shown in FIG. 2. Like the embodiment shown in FIG. 2, the internal wiring would be providing a continuous, path for the power circuit from the power input connection 10 to the power circuit contacts within the male multi-wire connector 11. In this embodiment, however, power is fed into the power circuit from any telephone jack having a dormant line or set of wires that in turn provides a continuous path to other telephone jack locations making use of the combined power-communication cable described above. This embodiment of the invention would work best in an environment using a non-star wiring layout because power introduced at any one telephone jack may then be communicated to the other telephone jacks.

In practical terms, the invention would be packaged as a kit. The kit for providing combined power and telecommunication transmission over telephone wiring at or beyond the demarcation point would comprise one or more power input modules and one or more power-communication cables.

The power input module preferably comprises:
(a) one or more power output connections to connect at one end thereof the current-carrying line;
(b) one or more power input connections to connect at one end thereof an external power supply; and,
(c) connection means for transmitting said current from one or more power input connections to one or more power input connections.

The power input module preferably includes over-current and short circuit protection means (not shown).

It will be appreciated that the above description relates to a preferred embodiment by way of examples only. Many variations on the invention will be obvious to those knowledgeable in the field, and such obvious variations are within the scope of the invention as described and claimed, whether or not expressly described. For instance, the embodiments described was limited to facilities having only one active line, however, the above can be adapted to provide combined power and communication service for facilities where two or more lines are active, and that adaption is within the spirit and scope of the invention.

What is claimed as the invention is:

1. A combined power and communication delivery system, for installation anywhere between the demarcation point and at least one female multi-wire outlet telephone jack in a building, for providing power and communication data to at least one communication device, wherein said system comprises:

(a) a power input module for receiving power from an external power supply and is coupled to said telephone jack; wherein said module comprises wire terminals for receiving a plurality of voice and data communication wires running from said demarcation point such that said wires are coupled to said at least one telephone jack via said wire terminals;

(b) among said plurality of voice and data communication wires, a pair of said wires is being unused voice and data communication wires and used as current-carrying wires; the remaining wires of said wires are being active voice and data communication wires; wherein said power input module for retransmitting power from said external power supply to said at least one communication device via at least one power-communication cable and said current-carrying wires running from said power input module to said telephone jack;

(c) wherein said power-communication cable comprises a first end, a second end and a third end; wherein said first end being a male multi-wire plug to releasably engage said female multi-wire telephone jack; wherein said third end and second end are coupled to said at least one communication device for providing said power, and said voice and data, respectively; wherein said second end depending from said first end carrying at least one voice and data communication transmission wire for electrical communication with said active voice and data communication wires, and said third end depending from said first end to transmit current from said current-carrying wire, so that said second end is electrically connected to said active voice and data communication wires and said third end is electrically connected to said current-carrying wires.

2. A system as claimed in claim 1, wherein said power input module is stationed at or just beyond the demarcation point.

3. A system as claimed in claim 2, wherein said power input module is stationed at any point between telephone jacks.

4. A system as claimed in claim 1, wherein said power input module comprises:

(a) a power input connection to connect at one end thereof said external power supply for receiving power from said external power supply;

(b) wherein said wire terminals to connect at one end thereof said current-carrying wires;

(c) connection means for transmitting current from said input connection to said wire terminals.

5. A system as claimed in claim 4, wherein said power input module includes over-current and short circuit protection means.

6. A system as claimed in claim 5, wherein said power input module includes a removable cover, said cover when removed provides access to said wire terminals.

7. A system as claimed in claim 6, wherein said system further comprises a power cable for providing power from said external power supply to said power input module; wherein said input connection is a female coaxial connector to receive a male coaxial plug of said power cable; said power cable having a further end including a power plug connected to said external power supply.

8. A kit for providing combined power and telecommunication transmission over telephone wiring to at least one communication device, a plurality of voice and data communication wires are running from a demarcation point to at least one female multi-wire outlet telephone jack in the building, one pair of said wires being an unused voice and data communication wire and the remaining wires of said wires being active voice and data communication wires, said kit comprising:

(a) at least one power input module for receiving power from an external power supply, said power input module connected to said at least one female multi-wire telephone jack via a male multi-wire connection of said module such that said module is electrically connected to said wires; wherein said module further comprises a connection means and a female multi-wire connection; wherein said connection means electrically connects said wires to said female multi-wire connection; wherein said pair of said wires running from said telephone jack to said module in the connection means are being current-carrying wires in said module; wherein said power input module for retransmitting power from said external power supply to said at least one communication device via at least one power-communication cable and said current-carrying wires;

(b) wherein said at least one power-communication cable comprises a first end, a second end and a third end; wherein said first end being a male multi-wire plug to releasably engage said female multi-wire connection of said at least one power input module; wherein said second end and third end are coupled to said at least one communication device for providing said power, and said voice and data, respectively; wherein said second end depending from said first end carrying at least one voice and data communication transmission wire for electrical communication with said active voice and data communication wires, and said third end depending from said first end to transmit current from said current-carrying wire, so that said second end is electrically connected to said active voice and data communication wires and said third end is electrically connected to said current-carrying wires.

9. A kit as claimed in claim 8, wherein each of said modules includes over-current and short circuit protection means.

* * * * *